INVENTORS
HUBERT E. TOBEY
ROBERT G. HALL
BY DANIEL D. KORZEKWA
CHARLES R. DILDAY

ATTORNEY

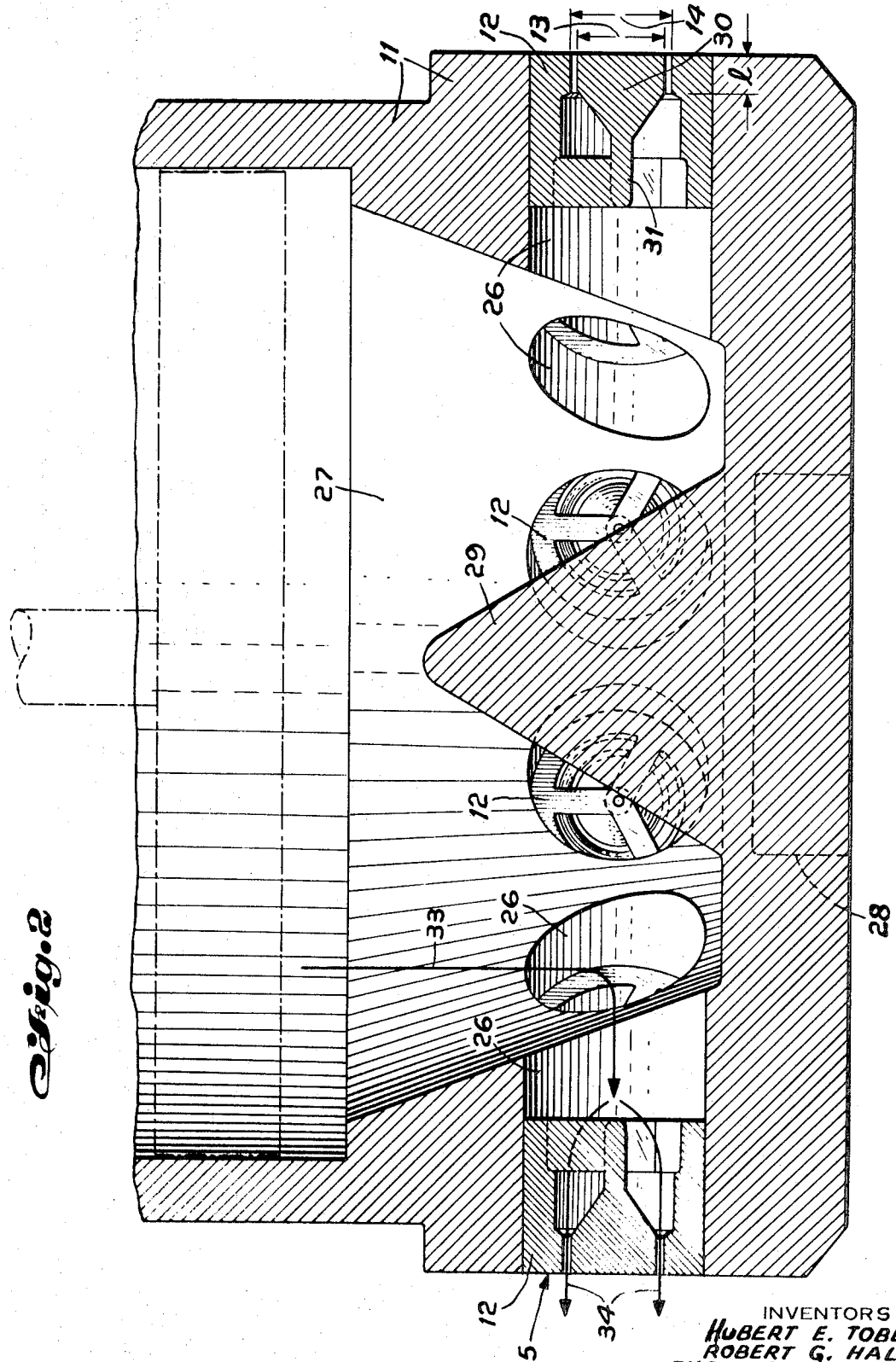

United States Patent Office 3,572,255
Patented Mar. 23, 1971

3,572,255
FOOD PRODUCT FORMING APPARATUS
Robert G. Hall, Memphis, Tenn., Hubert E. Tobey, Maywood, N.J., and Daniel D. Korzekwa and Charles R. Dilday, Memphis, Tenn., assignors to International Telephone and Telegraph Corporation, Nutley, N.J.
Filed May 19, 1969, Ser. No. 825,880
Int. Cl. A21c *11/16*
U.S. Cl. 107—14
10 Claims

ABSTRACT OF THE DISCLOSURE

The food product forming apparatus consists of an annular ring in which are positioned a number of extruding dies. The tubular product which is extruded from the dies is cut to a given length by a number of wires passing across the face of the dies.

BACKGROUND OF THE INVENTION

The invention relates to apparatus for forming a food product, and more particularly to apparatus for forming a tubular structure by extruding a suitably prepared masa or dough.

In producing a food product, the shape and length of the products resulting from the die combines with the ingredients and the subsequent processing to produce a product having a specific or unique characteristic. The subject product is formed by extrusion through a die having dimensions and design so that the product, when cut off and processed, has a double wall structure which is the result of the combined action of the dies upon the masa and the final processing. The dies acting on the masa, which is specially prepared as to fineness, firmness, cohesiveness and flow characteristics form tubular extrusions with a relative smooth surface both inside the tube and out. When suitable lengths are extruded, they are cut off so that they drop free of the apparatus for further processing, for instance, into hot oil for frying.

SUMMARY OF THE INVENTION

It is therefor an object of the invention to provide an improved apparatus for forming a food product of tubular shape having smooth inside and outside surfaces, and having a variable length.

It is a feature of the invention that the apparatus is particularly suited for extruding a suitable prepared masa or dough such as described in the assignee's copending application of Kass Hlynka, Ser. No. 827,498, filed May 23, 1969.

According to the broader aspects of the invention there is provided a stationary annular ring adapted to hold a plurality of dies about its circumference, each die having a configuration suitable to form a tubular extrusion having smooth inner and outer surfaces. The annular ring is coupled to heat and control extruding equipment through a rotatable gear member mounted atop the ring. The cut off length is provided by wires anchored to the rotating gear member and stretched across the face of the dies and anchored to a bottom plate which is mounted to rotate with the geared member, and the speed at which the wires pass over the face of the dies determines the cut off length of the tubular extrusion.

BRIEF DESCRIPTION OF THE DRAWINGS

The following description will best be understood by reference to the accompanying drawings in which:

FIG. 2 is a partial cross sectional view of the annular ring taken to show the cross sectional view of two of the dies according to the invention and a boss intermediate to each of the dies according to the invention.

DESCRIPTION OF THE PREFERRED EMBODIMENT

Figure 1:
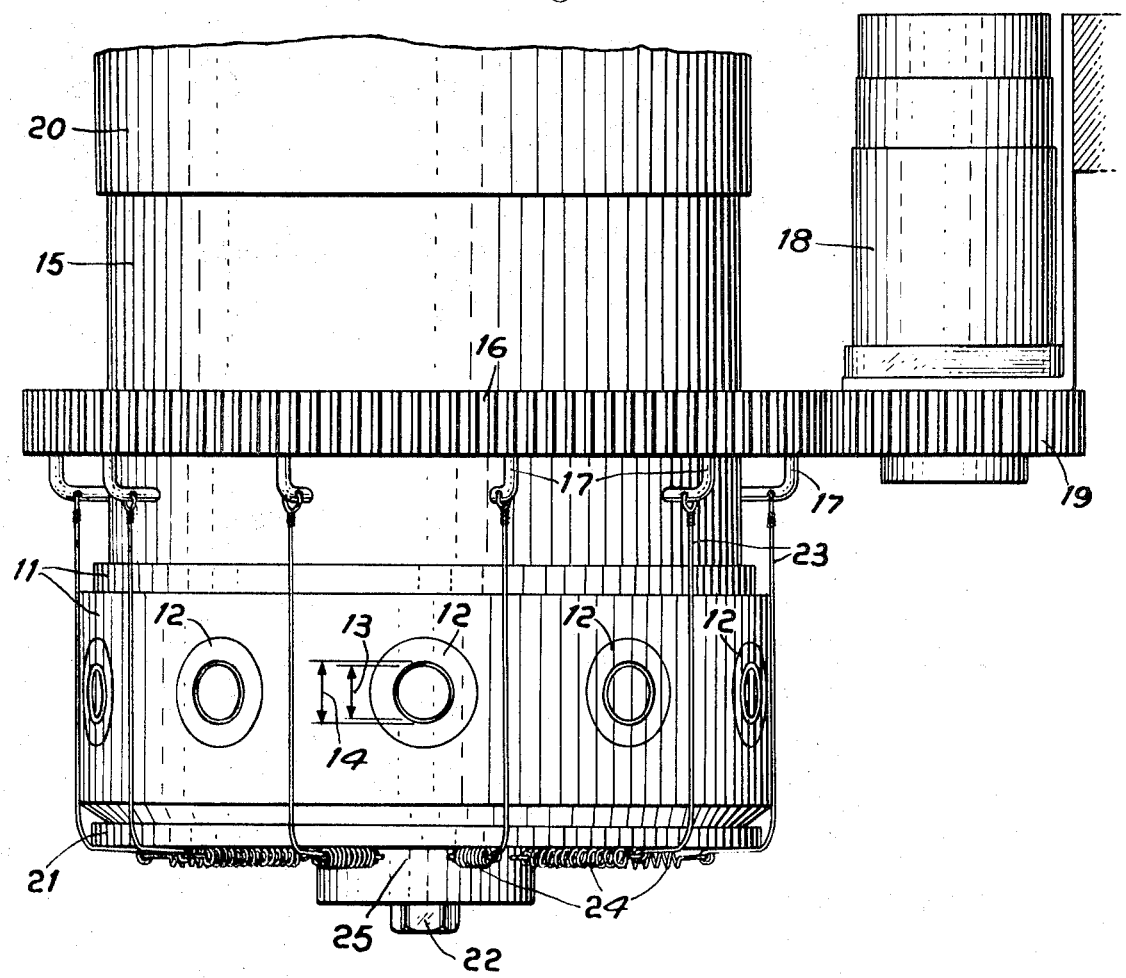
FIG. 1 illustrates the apparatus according to the invention.
Figure 3:
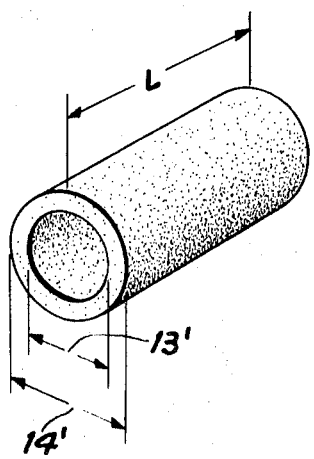
FIG. 3 illustrates a tubular shaped food product of the type produced by the apparatus of the invention.

FIG. 1 shows the apparatus for producing the tubular product illustrated in FIG. 3. A stationary annular ring 11 has a plurality of dies 12 positioned around the circumference of the ring. The diameters 13 and 14 of the dies match the diameters 13', 14' of the tubular product shown in FIG. 3. Mounted atop the stationary annular ring 11 is a rotatable gear member 15 having a gear 16 fixed around its outer circumference. Anchor means 17 are attached between the gear member body and the gear 16. Speed control and drive means 18 are mounted and coupled by gears 19, 16 to member 15. Means 18 controls and drives the rotatable gear member via the gear coupling at a predetermined and desired speed.

Member 20 is attached to feed the masa or dough material into interior of the annular ring. Member 20 is coupled and positioned above the rotating gear member 15 so that it does not rotate, but is stationary as the annular ring 11. Member 20 also maintains the material inserted into the annular ring at the prescribed heat and flow rate.

A rotatable plate 21 positioned at the bottom of the annular ring and rotatably mounted, so that it is able to move with the rotating gear member 15. Plate 21 has a hub 25 through which is a bearing mounted bolt 22. The rotation imparted to plate 21 is determined by music wires 23 attached between the anchor means 17 and plate 21. A member of springs 24 are attached between the hub 25 of the plate and the wires to maintain the tension on the music wires 23 and drag the plate 21 at the speed of gear 16, so that the music wires 23 move across the dies 12 to cut off the tubular extrusions.

It should be noted that the speed at which the music wires 23 move across the face of the dies determine the length L, FIG. 3, of the tubular product. The slower the speed imparted by means 18, the slower the movement of the music wires across the face of the dies and the longer the length L. Conversely, the faster the rotation of gear member 15 and plate 21, the shorter the tubular length L. The springs 24 are adjustable to maintain the tension on the wire so that they move across the face of the dies at the speed of gear 16.

Referring additionally to FIG. 2, a partial cross-sectional view illustrates certain features of the annular ring 11 of FIG. 1. The annular ring 11 has the dies 12 positioned in machine channels 26 radially extending from inner cavity 27 of the ring. The annular ring is center tapped 28 as shown in dashed lines, for mounting the thru bolt of FIG. 1 which in turn mounts the rotatable plate 21. A boss 29 is positioned intermediate each die channel. Each of the dies 12 have a funnel shaped center portion 30 which at its inner forming diameter 13 determines the inner tubular product diameter 13', and its outer forming diameter 14 determines the outer diameter 41' of the tubular product. The funnel shaped inner portion 30 of the die has, at its narrow neck portion 31, a plurality of structural ribs 32.

In a specific embodiment, brass dies were utilized having a .625 inch diameter 14 and a .500 inch diameter 13. The die length *l* used in this specific embodiment was .500 inches.

In operation, the flow of masa or dough from means 20 into the interior cavity 27 may be forced by a hydraulic piston as indicated in dashed lines. The flow of the material is represented by arrows 33 and 34 and is into each of the chambers 26, and thru the inner and outer forming diameters 13 and 14. This apparatus produces the tubular product of FIG. 3 having length L which is determined by the speed at which the wires pass against the face 35 of the dies.

Described above is an apparatus for forming by extrusion a tubular structured food product. In one case, a steel machined annular ring having at least 10 extruding brass dies, is coupled by a geared intermediate member to heat and control extruding equipments. The cut off length of the product is provided by 12 music wires directly anchored to the gear member at the top of the annular ring, and stretched across the face of the dies by spring means and anchored to a rotatable bearing mounted aluminum plate at the bottom of the ring. This plate rotates with the gear, and the speed at which the wires pass over the face of the dies provide the desired cut off length of the tubular product.

We claim:

1. Apparatus for extruding material and cutting the extrusions into short lengths comprising:
    a die ring having radical extrusion openings therein through which the material is forced to form tubular extrusions; and
    a pair of spaced plates supporting a plurality of wire cutters which are dragged around in contact with the periphery of the die ring for cutting the tubular extrusion into short pieces so that they fall free of the apparatus.

2. Apparatus for forming a tubular food product comprising:
    a stationary annular ring having a plurality of radially spaced channels therein;
    a plurality of extruding dies, one die positioned in each of said channels;
    a rotating gear member mounted atop said ring and coupling the inner chamber of said ring to the product material to be formed in said dies;
    a rotatably mounted bottom plate;
    a plurality of wires anchored to said gear member and stretched across and against the face of the dies and attached to said bottom plate,
    whereby, the speed at which the wires pass over the dies determines the cut off tubular length.

3. The apparatus of claim 2 wherein said die has a funnel shaped inner portion which forms the inner diameter of said tubular product, and the neck of said inner portion is attached by a plurality of radial ribs to outer forming wall of the die, the outer wall forming the outside diameter of the tubular product.

4. The apparatus of claim 2 including a ring gear mounted on the circumference of said rotating gear member, and drive means coupled to said ring gear for driving and controlling the speed of said rotating member.

5. The apparatus of claim 4, including spring means attached to said bottom plate and coupled to said wires to maintain tension on said wires so that they move across the face of the dies at the speed of said drive means.

6. A die assembly for extruding material and cutting the extrusions into short tubular lengths comprising:
    a die ring having a plurality of radially positioned dies, through the extrusion openings of which a stable composition is forced to form the tubular extrusions; and
    a pair of spaced plates, at least one of which is driven, support a plurality of spring loaded wire cutters between them, these cutters are moved around the periphery of the die ring at the speed of the driven plate for cutting the cylindrical extrusion into short pieces determined by the speed, so that they fall free of the apparatus.

7. Apparatus for forming a tubular structured food product comprising:
    a stationary annular ring having a plurality of radially spaced channels therein;
    a plurality of extruding dies, one die positioned in each of said channels so that the face of each die is tangent to the outer circumference of said ring;
    speed control and drive means;
    a rotatable gear member mounted atop said ring and gear coupled to said drive means;
    means coupling the inner chamber of said ring to the food material to be formed in the tubular product in said dies;
    a rotatably mounted bottom plate to rotate at the speed of said gear member;
    a plurality of cutting wires anchored to said gear member and stretched across the face of the dies and attached by spring means to said plate,
    whereby, the speed at which the wires pass over the dies determines, the cut off tubular length.

8. The apparatus of claim 7 wherein said die has a funnel shaped inner portion which forms the inner diameter of said tubular product, the neck of said funnel portion is attached by a plurality of radial extending ribs an outer forming wall of the die, and the outer wall of the die forms the outside diameter of the tubular product.

9. The apparatus of claim 8 including a ring gear mounted on the circumference of said rotatable gear member and meshes with an output gear of said drive means for driving said rotatable member and dragging along said bottom plate at the driving speed.

10. The apparatus of claim 9 said spring means are attached to a hub on said bottom plate and maintain tension on said wires so that the said wires are dragged across the face of the dies at the speed of said drive means.

References Cited

UNITED STATES PATENTS

| | | | |
|---|---|---|---|
| 1,248,963 | 12/1917 | Webber | 18—14 |
| 2,635,561 | 4/1953 | Elsaesser | 107—14.5 |
| 2,979,769 | 4/1961 | Andrew | 18—12 |
| 3,295,469 | 1/1967 | Vassalli | 107—14 |

HENRY S. JAUDON, Primary Examiner

U.S. Cl. X.R.

18—12, 14